United States Patent
Kahn

(10) Patent No.: US 9,800,838 B2
(45) Date of Patent: Oct. 24, 2017

(54) METHOD AND SYSTEM FOR PROVIDING CONTENT TO A CONTENT DISTRIBUTION SYSTEM SUITABLE FOR A MULTIPLE DWELLING UNIT USING AN AUTHORIZATION LIST

(75) Inventor: Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 745 days.

(21) Appl. No.: 11/862,883

(22) Filed: Sep. 27, 2007

(65) Prior Publication Data

US 2009/0089843 A1    Apr. 2, 2009

(51) Int. Cl.
| | | |
|---|---|---|
| *H04N 7/16* | (2011.01) | |
| *H04N 21/214* | (2011.01) | |
| *H04N 21/2347* | (2011.01) | |
| *H04N 21/258* | (2011.01) | |
| *H04N 21/61* | (2011.01) | |
| *H04N 21/266* | (2011.01) | |
| *H04N 7/10* | (2006.01) | |

(52) U.S. Cl.
CPC ......... *H04N 7/165* (2013.01); *H04N 21/2143* (2013.01); *H04N 21/2347* (2013.01); *H04N 21/25808* (2013.01); *H04N 21/6143* (2013.01); *H04N 7/106* (2013.01); *H04N 21/266* (2013.01)

(58) Field of Classification Search
CPC ................................... H04N 21/266
USPC ............................. 725/9, 25, 31
See application file for complete search history.

(56) References Cited

U.S. PATENT DOCUMENTS

| | | |
|---|---|---|
| 5,812,671 A | 9/1998 | Ross, Jr. |
| 5,850,218 A | 12/1998 | LaJoie |
| 6,275,990 B1 | 8/2001 | Dapper et al. |
| 6,493,876 B1 | 12/2002 | DeFreese |
| 6,871,193 B1 | 3/2005 | Campbell et al. |

(Continued)

FOREIGN PATENT DOCUMENTS

WO    2006107350 A1    10/2006

OTHER PUBLICATIONS

Non-final Office action dated Nov. 10, 2010 in U.S. Appl. No. 11/863,041, filed Sep. 27, 2007 by Raynold M. Kahn.

(Continued)

*Primary Examiner* — Michael Hong
(74) *Attorney, Agent, or Firm* — Harness, Dickey & Pierce, PLC

(57) ABSTRACT

A communication system 10 includes a head end 12 that generates a device list with channel or content authorizations. The head end communicates the list to a system gateway 26. The gateway 26 receives the list. A plurality of user devices 28 is coupled to the gateway 26. A first device of the plurality of user devices generates a channel or content request at the system gateway. The gateway 26 compares the channel or content authorizations from the list to the channel request from the first user device and communicates to the first user device a channel or content corresponding to the channel request in response to comparing. Thus, authorized users are able to receive the channel or content in response to the list. The list may be generated at a subscriber information module 52 and communicated with the content or channel through a satellite 18 or through a communication network 50.

33 Claims, 4 Drawing Sheets

(56) References Cited

U.S. PATENT DOCUMENTS

| | | |
|---|---|---|
| 6,961,858 B2 | 11/2005 | Fransdonk |
| 7,162,642 B2 | 1/2007 | Schumann et al. |
| 7,203,314 B1 | 4/2007 | Kahn et al. |
| 7,489,780 B2* | 2/2009 | Dellow et al. ............... 380/239 |
| 7,600,249 B1* | 10/2009 | Blevins .............. H04N 7/17318 725/78 |
| 7,676,040 B2 | 3/2010 | Augenstein et al. |
| 7,690,022 B2 | 3/2010 | Basawapatna et al. |
| 7,818,578 B2 | 10/2010 | Lewis |
| 8,050,406 B2 | 11/2011 | Pedlow, Jr. |
| 8,266,657 B2 | 9/2012 | Margulis |
| 8,483,393 B2 | 7/2013 | Robert |
| 2003/0030720 A1 | 2/2003 | Hutchings |
| 2004/0125957 A1 | 7/2004 | Rauber et al. |
| 2004/0143839 A1* | 7/2004 | Gonzales-Caiazzo et al. 725/29 |
| 2004/0242197 A1* | 12/2004 | Fontaine .............. H04W 8/183 455/411 |
| 2004/0268408 A1 | 12/2004 | Lee et al. |
| 2005/0028191 A1* | 2/2005 | Sullivan et al. ............... 725/28 |
| 2005/0073522 A1 | 4/2005 | Aholainen et al. |
| 2005/0169473 A1 | 8/2005 | Candelore |
| 2007/0124602 A1 | 5/2007 | Wald et al. |
| 2007/0143804 A1* | 6/2007 | Wang ............................. 725/95 |
| 2007/0199042 A1* | 8/2007 | Yip ........................ H04H 20/04 725/135 |
| 2007/0234084 A1 | 10/2007 | Furuta |
| 2007/0266409 A1 | 11/2007 | Hsu |
| 2008/0069126 A1 | 3/2008 | Howcroft et al. |
| 2008/0120635 A1* | 5/2008 | Trimper et al. ................. 725/25 |
| 2008/0163318 A1* | 7/2008 | Chen ...................... H04N 7/165 725/109 |
| 2009/0320058 A1 | 12/2009 | Wehmeyer et al. |

OTHER PUBLICATIONS

Non-final Office action dated Dec. 22, 2010 in U.S. Appl. No. 11/862,981, filed Sep. 27, 2007 by Peter M. Klauss et al.
Final Rejection dated Apr. 25, 2011 in U.S. Appl. No. 11/863,041, filed Sep. 27, 2007 by Raynold M. Kahn.
Notice of Allowance dated May 8, 2013 in U.S. Appl. No. 11/863,041, filed Sep. 27, 2007 by Raynold M. Kahn.
Final Rejection dated Oct. 9, 2013 in U.S. Appl. No. 13/461,617, filed May 1, 2012 by Peter M. Klauss et al.
Final Rejection dated Feb. 2, 2012 in U.S. Appl. No. 11/862,981, filed Sep. 27, 2007 by Peter M. Klauss et al.
Non-final Office action dated Mar. 4, 2014 in U.S. Appl. No. 13/461,617, filed May 1, 2012 by Peter M. Klauss et al.
Final Rejection dated Aug. 20, 2014 in U.S. Appl. No. 13/461,617, filed May 1, 2012 by Peter M. Klauss et al.
Non-final Office action dated Oct. 16, 2014 in U.S. Appl. No. 13/967,253, filed Aug. 14, 2013 by Raynold M. Kahn.
Notice of Allowance dated Feb. 2, 2015 in U.S. Appl. No. 13/967,253, filed Aug. 14, 2013 by Reynold M. Kahn.
Oh, Soon Y.; Lau, Davide; Gerla, Mario; "Content Centric Networking in Tactical and Emergency MANETs"; Wireless Days (WD); 2010 IFIP; 2010; 5 pages.
Non-final Office action dated Feb. 13, 2015 in U.S. Appl. No. 13/461,617, filed May 1, 2012 by Peter M. Klauss et al.
Final Rejection dated Aug. 25, 2015 in U.S. Appl. No. 13/461,617, filed May 1, 2012 by Peter M. Klauss et al.
Non-final Office action dated Jan. 19, 2016 in U.S. Appl. No. 13/461,617, filed May 1, 2012 by Peter M. Klauss et al.
Final Rejection dated Jul. 26, 2016 in U.S. Appl. No. 13/461,617, filed May 1, 2012 by Peter M. Klauss et al.

* cited by examiner

METHOD AND SYSTEM FOR PROVIDING CONTENT TO A CONTENT DISTRIBUTION SYSTEM SUITABLE FOR A MULTIPLE DWELLING UNIT USING AN AUTHORIZATION LIST

CROSS-REFERENCE TO RELATED APPLICATIONS

This application claims the benefit of U.S. application Ser. No. 11/862,981, filed Sep. 27, 2007. The disclosure of the above application is incorporated herein by reference

TECHNICAL FIELD

The present disclosure relates to a content delivery system and, more specifically, to a system that redistributes content to various devices within a building such as a multiple dwelling unit from a gateway on or within the building.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to the broadcast content. Access is provided using signals broadcast over the satellite. Once access is provided the user can access the particular content.

It may be desirable to provide satellite television to various users in a building such as a multiple dwelling unit (MDU) such as an apartment building, condominium office building, hotel or hospital. However providing antennas and the associated hardware for each unit on an individual basis is not cost effective and may consume a large portion of the building. This may not be aesthetically pleasing as well.

Providing content to a large number of consumers in a particular building must be done in a secure manner. Content may only be provided to authorized users.

SUMMARY

The present invention allows content to be distributed throughout a building using a gateway. Authorizations may be obtained through many types of communication means including through a satellite.

In one aspect of the disclosure, a method of communicating contents to a plurality of user devices in a system having a system gateway includes generating a user list having content authorizations for each user device, communicating the user list to a system gateway, communicating content to a system gateway, receiving a content request at the system gateway from a first user device from the plurality of user devices, comparing the content authorizations from the list to the content request from the user device and communicating to the first user device content corresponding to the content request in response to comparing.

In another aspect of the disclosure, a method of communicating channels to a plurality of user devices in a system having a system gateway includes generating a user list having channel authorizations for each user device, communicating the user list to a system gateway, communicating the channels to a system gateway, receiving a channel request at the system gateway from a first user device from the plurality of user devices, comparing the channel authorizations from the list to the channel request from the user and communicating to the first user device a channel corresponding to the channel request in response to comparing.

In yet another aspect of the disclosure, a method communicating channels to a plurality of user devices in a system having a system gateway includes generating a user list having channel authorizations for each user device of the plurality of user devices, generating a local key for each channel or plurality of channels to form a plurality of local keys, communicating the user list to the system gateway, communicating the channels to the system gateway, encrypting channels from the system gateway using a respective local key, communicating the local keys to the user devices in response to the list and decrypting channels at a plurality of user devices in response to the respective local key.

In still a further aspect of this disclosure, a system for distributing content includes a head end generating a device list having channel authorizations and communicating the user list and content. The system also includes a system gateway in communication with the head end, receiving the user list and content. A plurality of user devices is coupled to the gateway. A first user device of the plurality of user devices generates a content request at the system gateway. The gateway compares the content authorizations from the list to the content request from the first user device and communicates, to the first user device, content corresponding to the content request in response to comparing.

To enhance security in the system, some embodiments may include a satellite connection conveying the conditional access packets, encryption information and lists.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
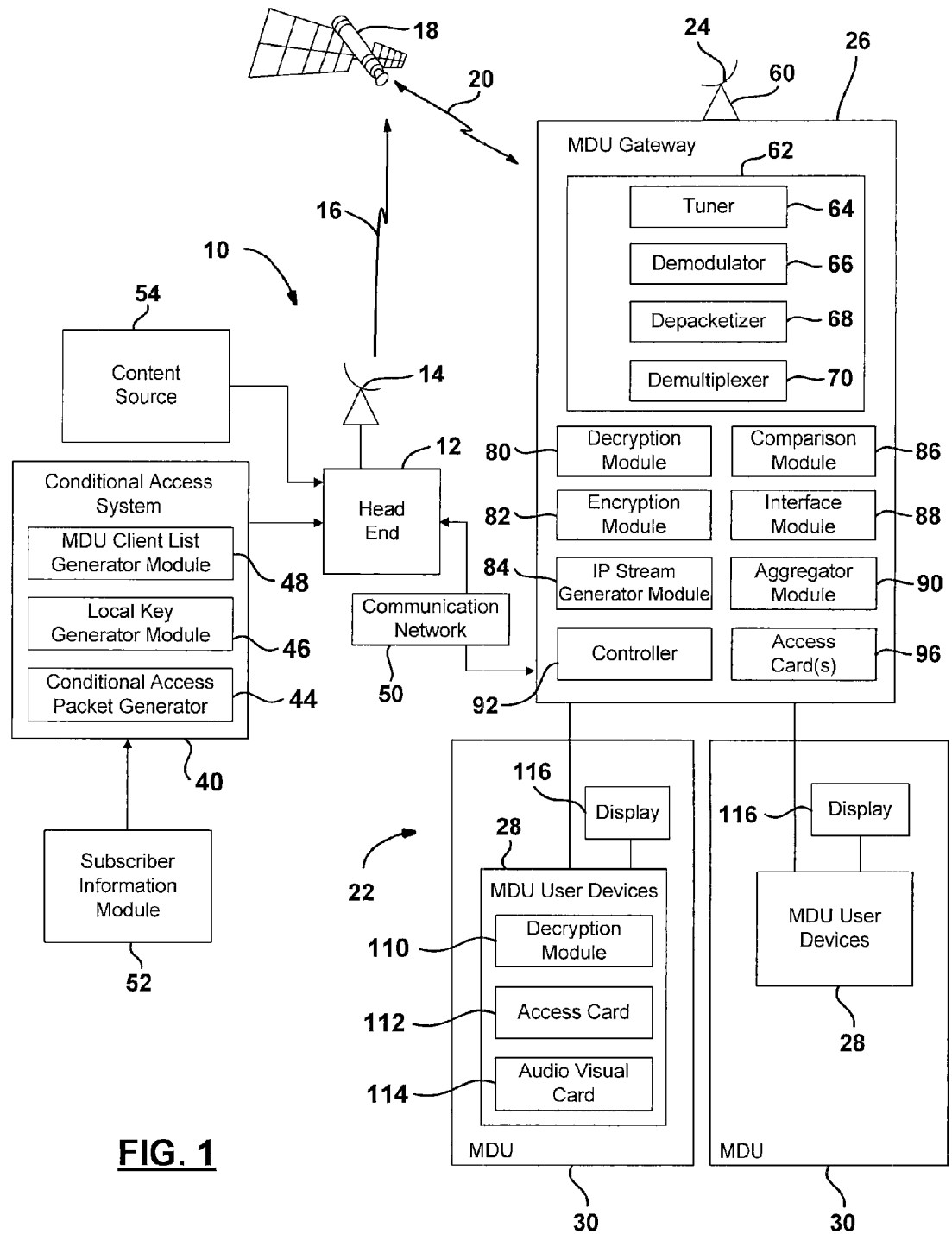
FIG. 1 is a block diagrammatic illustration of a content delivery system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present patent.

Further, while the following disclosure is made with respect to the delivery of content (e.g., television (TV), movies, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

As illustrated in FIG. 1, a communication system 10 includes a head end 12 that is coupled to an uplink antenna 14. The head end 12 may be used for many things, including multiplexing, modulating and uplinking signals 16 to satellite 18. It should be noted that satellite 18 may comprise a number of satellites operating in a system. The satellite 18 is used to generate downlink signals 20 to a multiple dwelling unit (MDU) delivery system 22, and, more specifically, to an antenna 24 of the multiple dwelling unit (MDU) delivery system 22. The multiple dwelling unit (MDU) delivery system 22 may include a gateway 26 that is used to receive signals from the satellite and distribute the signals to various client or user devices 28 that also constitute part of the MDU delivery system 22. Multiple dwelling unit (MDU) delivery system 22 may also be used to process the received satellite signals. The user devices 28 may be referred to as a set top box, a satellite set top box, or an integrated receiver decoder. The wireless communications between the head end 12 and the multiple dwelling unit (MDU) delivery system 22 may take place at any suitable frequency such as Ka band and/or Ku band frequencies. Information signals may also be communicated from the multiple dwelling unit (MDU) delivery system 22 to the head end 12 through the satellite 18. The delivery system 22 may use Internet protocol to delivery the content therein. Each user device and the gateway may have an IP address assigned thereto and use the respective IP addresses to communicate.

The multiple dwelling unit delivery system 22 communicates signals within a multiple dwelling unit 30. The multiple dwelling unit 30 may comprise various types of buildings in which multiple user devices are coupled to a gateway. Examples of such buildings include, but are not limited to, an apartment building, condominium, office building, hotel or hospital. The service gateway 26 is associated with the particular MDU 30. One or more gateways 26 may be provided. The gateway or at least the antenna 24 may be mounted to an outer roof structure or wall. The various modules of the gateway 26 may be disposed within the MDU 30. The gateway 26 may be wired or wirelessly connected to the user devices 28.

Various types of content and security information signals including but not limited to security information, encryption-decryption information, digital rights management information, purchase information packets (PIPs), conditional access packets (CAPs), channel or content access lists or rights may be communicated through the communication system 10. It should also be noted that various content may be encrypted based upon a control word (CW) known to the head end 12 and known to the various user devices and/or to the MDU gateway 26 and/or multiple dwelling unit (MDU) delivery system 22 authorized to view and/or play back the content. The control word packets (CWPs) may include, among other things, a time stamp, authorization requirements and an input value for generating the control word. Control word packets may from time to time be transmitted to the satellite to the MDU gateway 26.

The multiple dwelling unit (MDU) delivery system 22 may also communicate to the head end 12 through a communication network 50. The communication network 50 may include various types of communication, including but not limited to a telephone-type communication link, an Internet-type communication link, a fiber optic communication link, a wired terrestrial communication link, a terrestrial wireless or cellular link. The communications through the communication network 50 may include content signals into the MDU delivery system 22. The communication network 50 may replace the satellite 18. The MDU delivery system 22 may also transmit call back information such as program and pay-per-view requests and reportback, interactive television signals and gaming signals.

A conditional access system 40 may be coupled to or be part of the head end 12. The conditional access system 40 includes a permission packet generator such as a conditional access packet generator 44 and a local key generator module 46. A MDU client list generator module 48 may also be included within the conditional access system 40. The MDU client list generator module 48 may generate a user list in response to information from a subscriber information module 52. The signals from the conditional access system 40 are communicated to the head end 12 where the signals are broadcast to the (MDU) delivery system 22.

The subscriber information module 52 receives or collects information regarding the permissions of the various users. The information may take the form of a user list that includes channel or content permission authorizations for each of the various users. The users may be identified in various manners including using an IP address. The IP address may be specific to the MDU delivery system. That is, both the MDU delivery system 22 and/or the MDU gateway 26 and the user device 28 may be identified in the user list. Security information such as encryption or decryption information may also be in the user list. The security information may include but is not limited to local key information.

A content source 54 may include a content delivery network, a content repository having contents received from a content provider or providers. The content may be various types of content including video, audio, games, data, or the like. A number of different content providers may be used to provide various types of content to the content source 54. The content source 54 may be coupled to the head end 12 to provide conventional satellite television service. The contents of the content source 54 may be provided in various ways including through a fiber optic network, satellite, telephone line, tapes, or DVDs.

Referring back to the multiple dwelling unit (MDU) delivery system 22, the receiving antenna 24 receives signals that may include modulated multiplexed bit stream signals from the satellite 18 or communication network 50. The receive antenna signals are coupled from a reflector and a feed to a low noise block (LNB) 60 which amplifies and frequency-down converts the receive signals. The output of the LNB 60 is provided to a receiver 62 that receives the signals and may include a tuner 64, demodulator 66, a depacketizer 68, and a demultiplexer 70.

The gateway 26 may also include a decryption module 80 that is used for decrypting the incoming signals from the communication network 50 or the satellite 18. As will be further described below, the decryption module 80 may provide conventional satellite broadcast decryption. The decryption module 80 is an optional module for the system. The decryption module 80 may not be required at the gateway 26 if the individual user devices 28 perform the satellite broadcast decryption.

An access card or access cards 96 may also be included in the gateway 26. The access cards 96 may be used to generate control words for decrypting the incoming signals. The control words provide access to authorized content and channels. The access cards 96 may also be referred to as smart cards. A number of access cards 96 may be used to generate control words and thereby provide access to various channels, groups of channels or various programs or content. The control words may also be encrypted by the access cards 96 to form encrypted control words. The control words or the encrypted control words may be provided to the decryption module 80 at the gateway or may be transmitted to the user devices 28 to perform decryption. Different combinations of decryption and encryption will be described below.

An encryption module 82 may also be provided within the gateway 26. The encryption module 82 may be used to re-encrypt or super-encrypt the signals received from the communication network 50 or the satellite 18. Super-encryption is provided when encrypted signals are again encrypted with a local key. The encryption module 82, whether re-encrypted or super-encrypted, may use a local key. The encryption module 82 is an optional module for the system. The encryption module 82 may not be required if re-encryption or super-encryption is not provided at the gateway 26.

An IP stream generator module 84 may be used to generate an IP stream of the various channels or content received from the communication network 50 or satellite 18. The IP stream may broadcast signals to all user devices or target specific devices using the associated IP address.

A comparison module 86 may be used to compare a received list that is generated at the client list generator module 48 of the conditional access system 40 with a request from a user device 28. As will be mentioned below, the comparison module may provide access to a channel or content if the user device 28 is subscribed to the particular channel or content based upon the list.

An interface module 88 may be used to interface to the communication network 50. The interface module may transmit or receive information or signals from the communication network 50. The interface module 88 may format or reformat the material so it is suitable for communication using the particular medium.

An aggregator module 90 may also be included in the gateway 26. The aggregator module 90 may receive signals from the various user devices 28, collect them and form one consolidated communication signal through the communication network 50 or the satellite 18 to communicate the signals to the head end 12. The gateway 26 may also include a controller 92 for controlling various operations within the gateway 26. The controller 92 may be microprocessor-based. The various modules within the gateway 26 may also be incorporated in software within a controller 92.

The user devices 28 are in communication with the gateway 26. The gateway 26 and the user devices 28 may form a network such as a wired network or a wireless network. The gateway 26 communicates various content or channels or security information signals to each user device through the network. Each user device 28 may include a decryption module 110, an access card 112, and an audio-visual card 114. The audio-visual card 114 may include various functions including a tuner function, a demodulator function, a packetizer function, and a multiplexer function in much the same way as the receiver card 62 illustrated in the gateway 26. The user device 28 may also be associated with or include a display 116. The display 116 may include a television or other monitor-type device.

The decryption module 110 may be used to decrypt the signals from the gateway 26. Also, as mentioned above, the receive signals may not be encrypted at the gateway 26 and, thus, the decryption module may be used to decrypt the signals as they were transmitted from the satellite. Also, the decryption module 110 may provide double decryption to decrypt the super-encrypted signals. That is, the decryption module 110 may use a local key to, first, decrypt the signals to the condition the signals were received by the satellite. The signals may then use another decryption key for the communication system to decrypt the signals as they were transmitted through the satellite system.

The access card 112 may be used to generate control words to perform the decryption. Typical satellite television systems include an access card or conditional access card.

As mentioned above, a network may be formed between the user devices 28 and the gateway 26. That is, the gateway 26 may include an Internet protocol address. Each user device 28 may also include an Internet protocol address. The Internet protocol address may be compared in the comparison module as an identifier for comparison with the channel authorizations provided in the list. This will be further described below.

Figure 2:
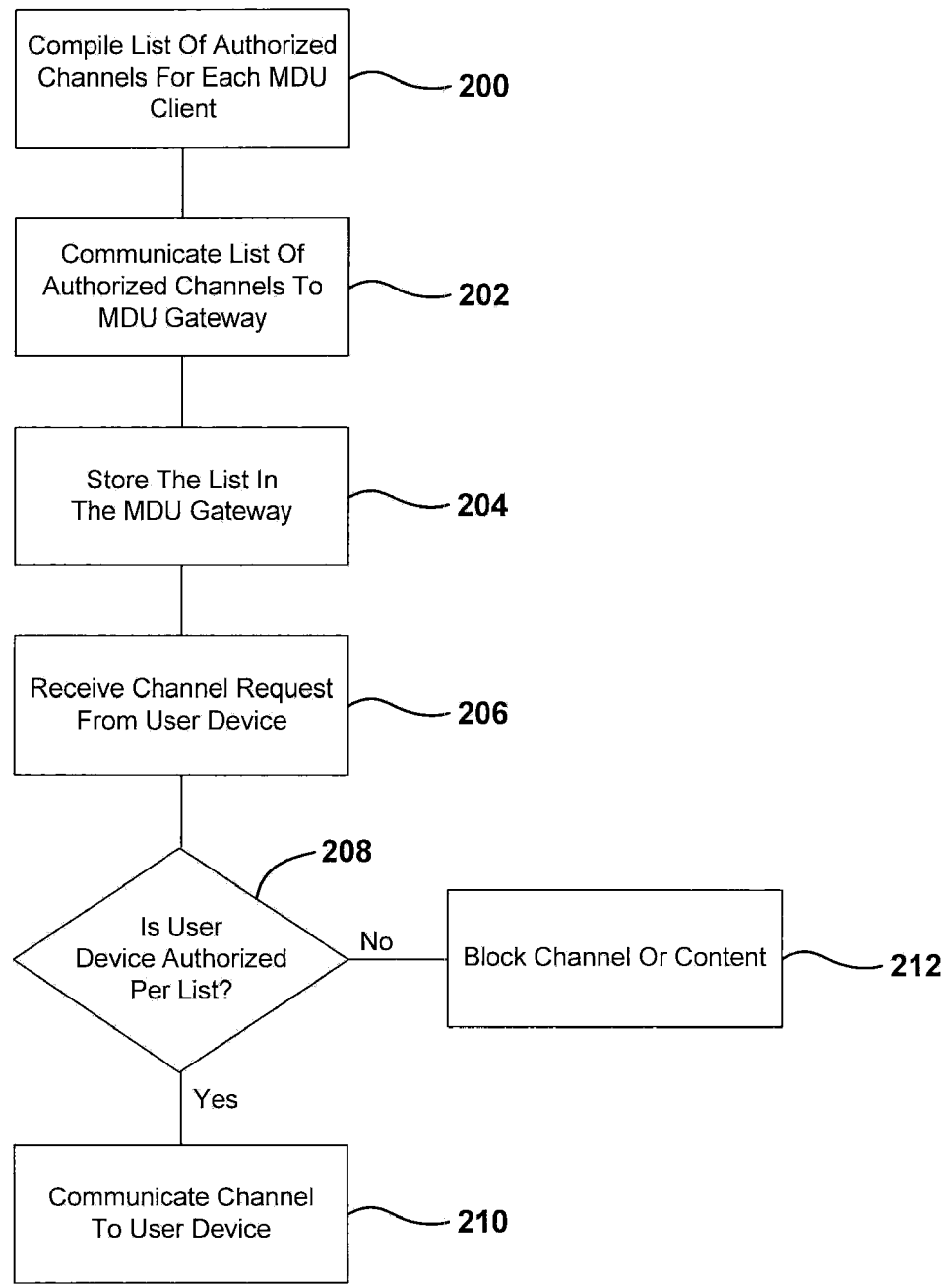
FIG. 2 is a flowchart of a first example for a method of operating the present disclosure.

Referring now to FIG. 2, a first method for operating the system is illustrated. In step 200, a list of authorized channels for each multi-dwelling unit may be compiled. The list may be compiled in a business center associated with the head end 12. The list may also be compiled in a subscriber information module 52. In step 202, a list of authorized channels is communicated to the MDU gateway 26. The list of authorized channels may include a list of channels authorized for each of the user devices associated with the multiple dwelling unit delivery system 22. The list may identify the authorized user devices by way of a user identifier or device identifier or an Internet protocol address.

The list may be communicated through a satellite 18 or through the communication network 50. In step 204, the list is stored in the gateway. In step 206, a channel request is received from a user device within the multiple dwelling unit delivery system 22.

In step 208, the list is compared to the user device. If the user device is authorized to receive the channel or content in step 208, step 210 communicates the channel or content to the device 28. In step 208, if the user device 28 is not authorized to receive the channel or content, step 212 blocks the channel or content.

Figure 3:
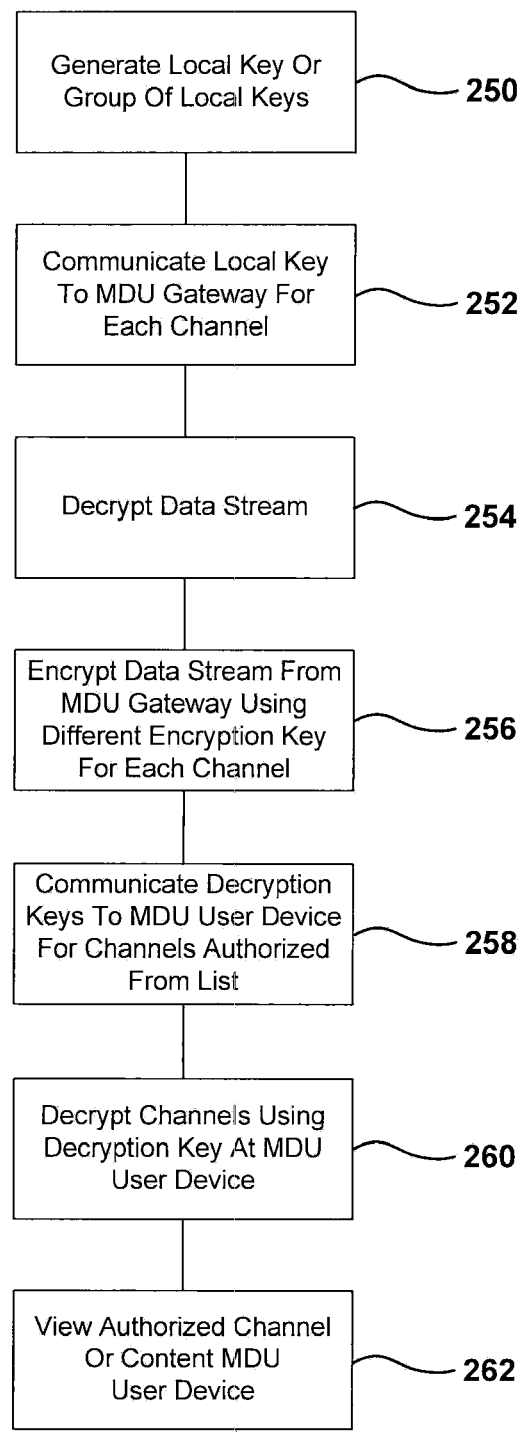
FIG. 3 is a flowchart of a second example for a method of operating the present disclosure.

Referring now to FIG. 3, in an alternative embodiment to that illustrated in FIG. 2 or an additional embodiment to be used in conjunction with FIG. 2, step 250 generates a local key or group of local keys. That is, a local key may be generated at the gateway 26 or head end 12 for each channel. It should also be noted that a group of channels may include the same local key. For example, a subscription service may include a subscription to a number of channels and, thus, only one local key may be required for all of the channels in that group.

In step 252, the local keys are communicated to the MDU gateway 26 for each channel. This step is performed if the head end generates the local keys. This is an optional step since local keys may be generated at the gateway 26. In step 254, the received data stream, such as the channel, may be decrypted at the gateway 26. This is an optional step since the data stream may be decrypted at the user device 28.

In step 256, the data stream of content or a channel from the gateway 26 may be encrypted using a different encryption key for each channel or group of channels. This re-encryption or super-encryption may be performed using the local keys generated in step 250. In step 258, the decryption keys may be communicated to the user devices for channels authorized from the list. In step 260, the channels are decrypted using the decryption key at the MDU user device. It should be noted that, in the case of super-encryption, a local key may be used to first decrypt these signals then a broadcast decryption key may be used to further decrypt the channel or content signals. In step 262, the authorized channel or content may be viewed by the user device 28. As is mentioned above, the steps of FIG. 3 may be used together with the steps of FIG. 2. That is, encryption and decryption may also be performed when the channel is communicated to the user device in step 210 of FIG. 2. Also, the encryption information may be contained in the list or may be broadcast in a CAP or other communication packet from time to time. The encryption packet may itself be encrypted.

Figure 4:
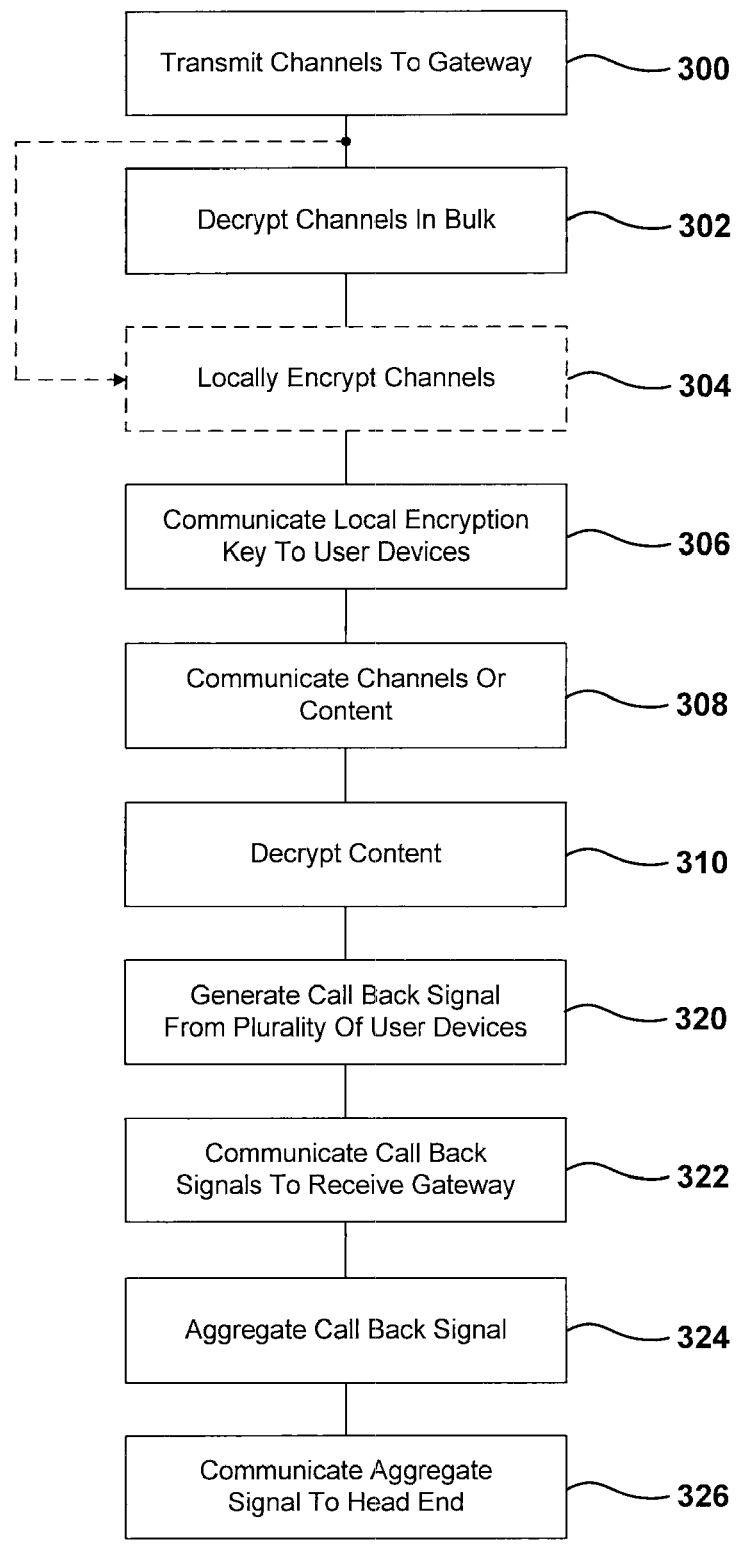
FIG. 4 is a flowchart of a third example for a method of operating the present disclosure.

Referring now to FIG. 4, another method for operating the communication system 10 is illustrated. In step 300, the channels are transmitted to a gateway 26. In step 302, the received channels may be decrypted in bulk at the gateway 26. Step 302 may also be skipped if the received channels are decrypted at the user device 28. In step 304, the channels or content may be locally encrypted. The local re-encryption or super-encryption may take place in the gateway 26 using local keys as described above. In step 306, the local encryption key is communicated to the user devices 28. In step 308, the various channels or content may be communicated to the user devices. In step 310, the content is decrypted or super-decrypted as mentioned above.

In step 320, call back signals may be generated from the plurality of user devices. Such call back may comprise program and pay-per-view requests and reportback, interactive television signals and gaming signals. In step 322, the call back signals are communicated to the service gateway. In step 324, the call back signals may be aggregated at the gateway. In step 326, the aggregate signal is communicated to the head end. The aggregate signal may be communicated over the satellite or communicated over the communication network.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of communicating content to a plurality of user devices in a multiple dwelling unit system having a multiple dwelling unit system gateway located in a multiple dwelling unit comprising:
generating a user list having content authorizations for each user device of the multiple dwelling unit system associated with the multiple dwelling unit system gateway at a conditional access system located remotely from the multiple dwelling unit system gateway, said user list generated in response to information from a subscriber information module associated with the conditional access system;
communicating the user list to the multiple dwelling unit system gateway from the conditional access system;
communicating content to the multiple dwelling unit system gateway;
receiving a content request at the multiple dwelling unit system gateway from a first user device of the plurality of user devices;
comparing the content authorizations from the user list to the content request from the user device at the multiple dwelling unit system gateway; and
communicating content to the first user device corresponding to the content request in response to comparing.

2. A method as recited in claim 1 further comprising when the content request is not on the list, preventing communication of the content to the first user device.

3. A method as recited in claim 1 wherein communicating content is performed when the content associated with the content request is in the user list.

4. A method as recited in claim 1 wherein communicating the user list comprises communicating the user list through a satellite.

5. A method as recited in claim 1 wherein communicating the content comprises communicating the content through a satellite.

6. A method as recited in claim 1 wherein communicating the user list comprises communicating the user list through a terrestrial link.

7. A method as recited in claim 1 wherein communicating the content comprises communicating the content through a terrestrial link.

8. A method as recited in claim 1 wherein communicating the user list comprises communicating the user list through a terrestrial link and wherein communicating the content comprises communicating the content through a satellite.

9. A method as recited in claim 1 wherein the user comprises an identifier and the user list comprises the identifier.

10. A method as recited in claim 1 wherein the user devices comprise multiple dwelling unit devices.

11. A method as recited in claim 9 wherein the identifier comprises an IP address.

12. A method of communicating channels to a plurality of user devices in a multiple dwelling unit system having a multiple dwelling unit system gateway located in a multiple dwelling unit comprising:
generating a user list having channel authorizations for each user device of the multiple dwelling unit system gateway at a conditional access system located remotely from the system gateway, said user list generated in response to information from a subscriber information module associated with the conditional access system;
communicating the user list to the multiple dwelling unit system gateway from the conditional access system;
communicating the channels to the multiple dwelling unit system gateway;
receiving a channel request at the multiple dwelling unit system gateway from a first user device from the plurality of user devices;
comparing the channel authorizations from the list to the channel request from the user at the multiple dwelling unit system gateway; and
communicating to the first user device a channel corresponding to the channel request in response to comparing.

13. A method as recited in claim 12 further comprising when the channel request is not on the list, preventing communication of the channel to the first user device.

14. A method as recited in claim 12 wherein communicating a channel is performed when the channel associated with the channel request is in the user list.

15. A method as recited in claim 12 wherein communicating the user list comprises communicating the user list through a satellite.

16. A method as recited in claim 12 wherein communicating the channels comprises communicating the channels through a satellite.

17. A method as recited in claim 12 wherein communicating the user list comprises communicating the user list through a terrestrial link.

18. A method as recited in claim 12 wherein communicating the channels comprises communicating the channels through a terrestrial link.

19. A method as recited in claim 12 wherein communicating the user list comprises communicating the user list through a terrestrial link and wherein communicating the channels comprises communicating the channels through a satellite.

20. A method as recited in claim 12 wherein the user comprises an identifier and the user list comprises the identifier.

21. A method as recited in claim 12 wherein the plurality of user devices comprise multiple dwelling unit devices.

22. A method as recited in claim 20 wherein the identifier comprises an IP address.

23. A system for distributing content to a multiple dwelling unit system gateway located in a multiple dwelling unit comprising:
a conditional access system generating a user list having content authorizations for each user device of the multiple dwelling unit system associated with the multiple dwelling unit system gateway, said user list generated in response to information from a subscriber information module associated with the conditional access system and communicating the user list and content to the system gateway;
the multiple dwelling unit system gateway, located remotely from and in communication with the conditional access system, receiving the user list and content;
a plurality of user devices coupled to the multiple dwelling unit system gateway forming the multiple dwelling unit system with the system gateway, a first user device of said plurality of user devices generating a content request and communicating the request to the multiple dwelling unit system gateway;
said multiple dwelling unit system gateway comparing the content authorizations from the user list to the content request from the first user device and communicating content to the first user device corresponding to the content request in response to comparing.

24. A system as recited in claim 23 wherein the multiple dwelling unit system gateway, when the content request is not on the user list, prevents communication of the content to the first user device.

25. A system as recited in claim 23 wherein the multiple dwelling unit system gateway communicates a channel when the channel associated with the content request is in the user list.

26. A system as recited in claim 23 further comprising a satellite in communication with the multiple dwelling unit system gateway and the satellite and conditional access system communicating the user list to the multiple dwelling unit system gateway.

27. A system as recited in claim 23 further comprising a terrestrial communication network in communication with the gateway and the conditional access system communicating the user list to the multiple dwelling unit system gateway.

28. A system as recited in claim 23 further comprising a satellite in communication with the system gateway and the conditional access system communicating the user list and content to the multiple dwelling unit system gateway.

29. A system as recited in claim 23 further comprising a terrestrial communication network in communication with the multiple dwelling unit system gateway and the conditional access system communicating the user list and the content to the multiple dwelling unit system gateway.

30. A system as recited in claim 23 wherein the user comprises an identifier and the user list comprises the identifier.

31. A system as recited in claim 23 wherein the plurality of user devices comprise multiple dwelling unit.

32. A system as recited in claim 23 wherein the multiple dwelling unit system gateway and the plurality of user devices are disposed within a multiple dwelling unit.

33. A system as recited in claim 30 wherein the identifier comprises an IP address.

* * * * *